(12) United States Patent
Zhang et al.

(10) Patent No.: US 11,352,067 B2
(45) Date of Patent: Jun. 7, 2022

(54) CROSS-MEMBER STRUCTURE FOR VEHICLE

(71) Applicant: Shanghai Yanfeng Jinqiao Automotive Trim Systems Co. Ltd., Novi, MI (US)

(72) Inventors: Junwei Zhang, Shanghai (CN); Bing Liu, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 17/110,895

(22) Filed: Dec. 3, 2020

(65) Prior Publication Data

US 2021/0086839 A1   Mar. 25, 2021

Related U.S. Application Data

(63) Continuation of application No. PCT/CN2019/095455, filed on Jul. 10, 2019.

(30) Foreign Application Priority Data

Jul. 12, 2018   (CN) .......................... 201810763412.9
Jul. 12, 2018   (CN) .......................... 201821103711.1

(51) Int. Cl.
   *B60J 7/00*      (2006.01)
   *B62D 25/14*    (2006.01)
   *B62D 29/04*    (2006.01)

(52) U.S. Cl.
   CPC ......... *B62D 25/145* (2013.01); *B62D 29/041* (2013.01)

(58) Field of Classification Search
   CPC .......... Y02P 90/02; A61P 35/00; A61P 43/00; H04L 5/0094; B33Y 10/00; B33Y 70/00;
   (Continued)

(56) References Cited

U.S. PATENT DOCUMENTS 5,088,571 A   2/1992   Burry et al.
5,269,574 A   12/1993  Bhutani et al.
(Continued)

FOREIGN PATENT DOCUMENTS

CN   203199051 U   9/2013
CN   102604369 B   3/2015
(Continued)

OTHER PUBLICATIONS

Extended European Search Report from the European Patent Office for EP Patent Application No. 19833627.3 dated Mar. 16, 2022 (in English) (9 Pages).
(Continued)

*Primary Examiner* — Kiran B Patel

(57) ABSTRACT

A cross-member structure for a vehicle is disclosed. The cross-member structure may comprise a beam structure (e.g. generally horizontal cross-member when installed) and a support (e.g. generally vertical when installed). The cross-member structure may provide support for an instrument panel and/or may integrate with vehicle systems. The cross-member structure may provide a set of sections/segments (e.g. section structures) for integration within the structure of the vehicle and with vehicle systems. The beam structure may comprise a set of mounting structures, a beam structure section, a steering system section, an intermediate section and an airbag system interface structure section. The cross-member structure may be configured with an arrangement of beam/structure sections, mounting sections, and structural elements including members, webs, flanges, stiffeners, reinforcement, plates, walls, surfaces, etc. The cross-member structure may provide structural reinforcement for the vehicle and may integrate vehicle systems/subsystems with the instrument panel.

14 Claims, 3 Drawing Sheets

(58) Field of Classification Search
CPC ......... H01L 2924/00; H01L 2924/0002; H01L 2224/48091; C07D 493/04
See application file for complete search history.

(56) References Cited

U.S. PATENT DOCUMENTS

| | | | | |
|---|---|---|---|---|
| 5,934,744 | A * | 8/1999 | Jergens | B62D 25/145 296/72 |
| 6,286,879 | B1 | 9/2001 | Haque et al. | |
| 6,988,764 | B2 * | 1/2006 | Matsutani | B62D 25/142 296/70 |
| 7,370,719 | B2 | 5/2008 | Sakamoto | |
| 8,801,087 | B2 * | 8/2014 | Kim | B62D 25/145 296/29 |
| 9,493,192 | B2 * | 11/2016 | Baudard | B62D 25/145 |
| 2003/0122404 | A1 * | 7/2003 | Duchez | B62D 29/004 296/70 |
| 2004/0262954 | A1 | 12/2004 | Scheib et al. | |
| 2008/0167415 | A1 | 7/2008 | Stoeppelmann et al. | |
| 2012/0032044 | A1 | 2/2012 | Ruiz Rincón | |
| 2014/0319879 | A1 * | 10/2014 | Reese | B29D 23/00 156/149 |
| 2015/0321398 | A1 | 11/2015 | Bharathan et al. | |
| 2017/0305476 | A1 | 10/2017 | Kulkarni et al. | |
| 2019/0031247 | A1 * | 1/2019 | Bau | B62D 25/142 |

FOREIGN PATENT DOCUMENTS

| | | | |
|---|---|---|---|
| CN | 104386136 A | 3/2015 | |
| CN | 105416405 A | 3/2016 | |
| CN | 205256458 U | 5/2016 | |
| CN | 205292812 U | 6/2016 | |
| CN | 205706896 U | 11/2016 | |
| CN | 106945729 A | 7/2017 | |
| CN | 107215397 A | 9/2017 | |
| CN | 105857406 B | 4/2018 | |
| CN | 207889833 U | 9/2018 | |
| CN | 207889833 U * | 9/2018 | |
| DE | 29619133 U1 | 12/1996 | |
| DE | 19715069 A1 | 10/1997 | |
| EP | 1415897 A2 | 5/2004 | |
| EP | 1686044 A1 * | 8/2006 | ......... B60R 16/0215 |
| EP | 2113448 A2 | 11/2009 | |
| EP | 2597017 A1 | 5/2013 | |
| EP | 2780216 B1 | 2/2016 | |
| FR | 2994680 A1 | 2/2014 | |
| JP | H08282333 A | 10/1996 | |
| WO | 2013182522 A1 | 12/2013 | |
| WO | 2016051331 A1 | 4/2016 | |
| WO | 2018025226 A1 | 2/2018 | |
| WO | 2018055515 A1 | 3/2018 | |
| WO | WO-2018055515 A1 * | 3/2018 | |

OTHER PUBLICATIONS

International Search Report and Written Opinion from the International Searching Authority for International Patent Application No. PCT/CN2019/095455 dated Oct. 21, 2019 (English Translation) (10 Pages).

* cited by examiner

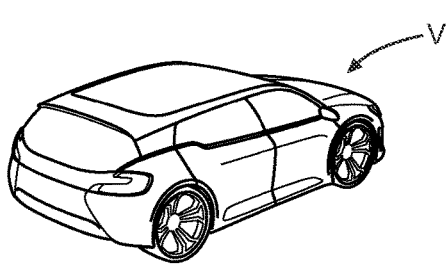
FIG. 1A
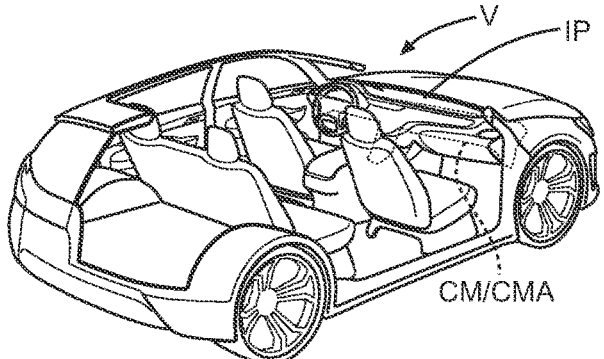
FIG. 1B
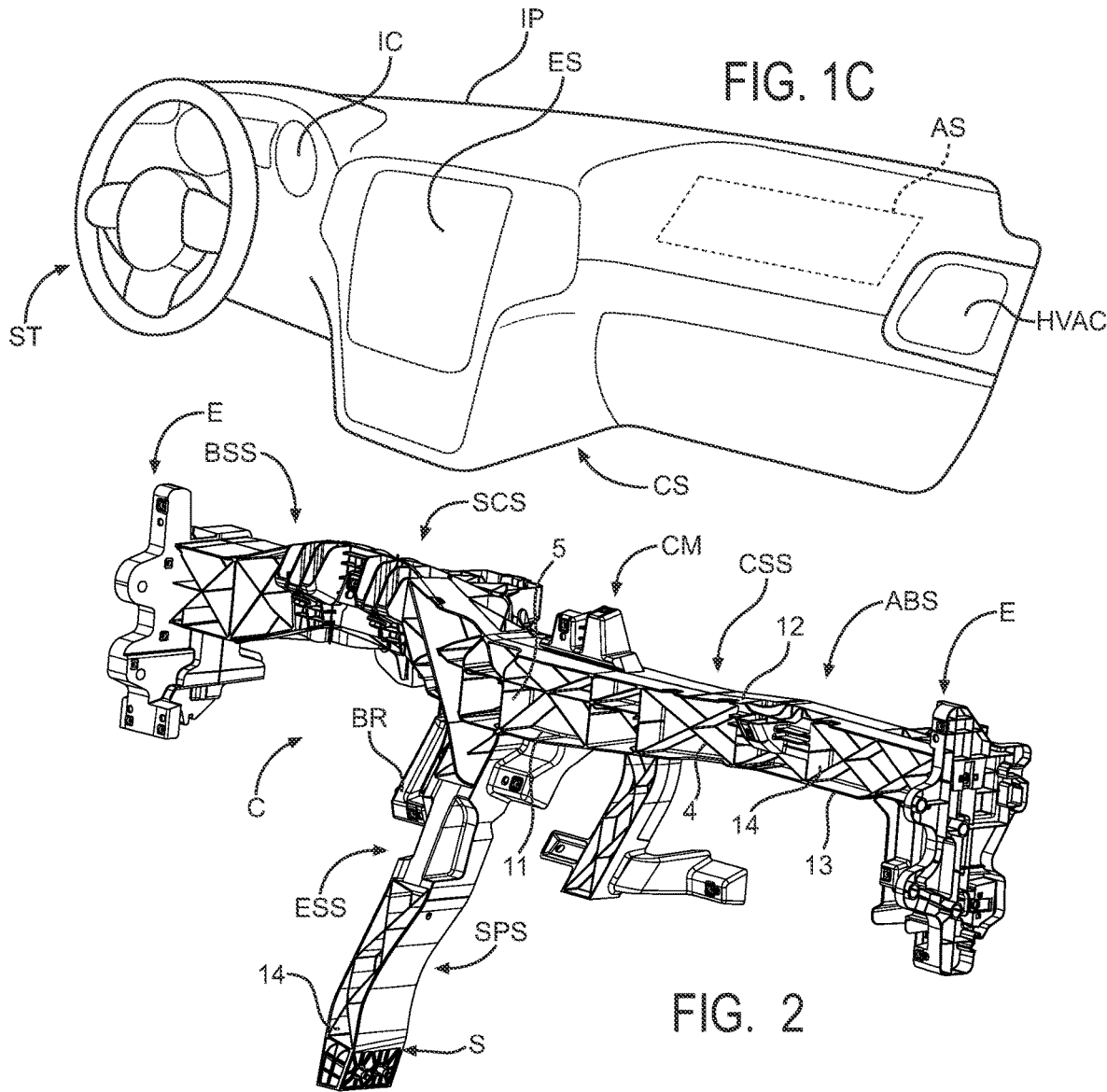
FIG. 1C
FIG. 2

US 11,352,067 B2

CROSS-MEMBER STRUCTURE FOR VEHICLE

CROSS-REFERENCE TO RELATED APPLICATIONS

The present application is a Continuation of PCT/International Patent Application No. PCT/CN2019/095455 titled "CROSS-MEMBER STRUCTURE FOR VEHICLE" filed Jul. 10, 2019, which claims priority to Chinese Patent Application No. 201810763412.9 filed Jul. 12, 2018 and Chinese Utility Model Application No. 201821103711.1 filed Jul. 12, 2018 (now Chinese Utility Model No. CN208715299U).

The present application claims priority to and incorporates by reference in full the following patent applications: (a) Chinese Patent Application No. 201810763412.9 filed Jul. 12, 2018; (b) Chinese Utility Model Application No. 201821103711.1 filed Jul. 12, 2018 (now Chinese Utility Model No. CN208715299U); (c) PCT/International Patent Application No. PCT/CN2019/095455 titled "CROSS-MEMBER STRUCTURE FOR VEHICLE" filed Jul. 10, 2019.

FIELD

The present invention relates to a cross-member structure for a vehicle.

BACKGROUND

It is known to provide a cross-member structure for a vehicle to provide reinforcement for the vehicle structure and integration with vehicle systems. Known lightweight cross-member structures may comprise assemblies that are complex in form/assembly and or that may provide challenges for manufacture/production.

It would be advantageous to provide an improved cross member structure for a vehicle that comprises a cross-member structure comprising multiple sections configured to provide structural properties/performance.

It would be advantageous to provide an improved cross-member structure for a vehicle that can be designed and constructed for use with materials that provide relatively light weight and relatively high strength and for efficient manufacture, for example as an integrally-formed component.

It would be advantageous to provide an improved cross-member structure for a vehicle that is configured for efficient manufacture and installation in a vehicle including integration with an instrument panel and one or more other vehicle systems.

SUMMARY

The present invention relates to a cross-member structure configured for installation in a vehicle providing vehicle systems comprising a beam structure comprising a set of mounting structures; a beam structure section; a steering column structure section and an intermediate structure section. The set of mounting structures may be configured to mount the beam structure to the vehicle. The beam structure may comprise a plastic material. The beam structure may comprise an integrally-formed component. The integrally-formed component may be formed from a composite material. The integrally-formed component may be formed from a molded plastic material. The beam structure may comprise an H-shaped cross-section; the H-shaped cross-section may comprise a section structure comprising a set of flanges and a web and at least one stiffener. The beam structure may comprise a multi-section structure; the beam structure may comprise a cross-member structure comprising a unitary construction providing relatively light-weight and relatively high-strength. The structure may comprise a support. The support may be integrally formed with the beam structure. The structure may comprise a bracket for the support. The beam structure section may comprise a section structure comprising a set of flanges and a web and at least one stiffener. The intermediate structure section may comprise a section structure comprising a set of flanges with a web and at least one stiffener. The steering column structure section may comprise a section structure comprising a web, a set of flanges, a reinforcement and at least one stiffener.

The present invention relates to a cross-member structure configured for installation in a vehicle providing vehicle systems comprising a beam structure comprising a set of mounting structures; a beam structure section; a steering column structure section and an intermediate structure section. The set of mounting structures may be configured to mount the beam structure to the vehicle. The beam structure may be configured to provide structural reinforcement for the vehicle and to integrate with at least one vehicle system. The beam structure may comprise an H-shaped cross-section. The H-shaped cross-section may comprise a section structure comprising a set of flanges and a web and at least one stiffener. Each flange of the set of flanges may be configured in a generally parallel arrangement. The beam structure may comprise at least one of (a) a composite material and/or (b) plastic material and/or (c) an integrally-formed component formed from a composite material. The structure may comprise a support configured to provide structural reinforcement. The beam structure and a base of the support may comprise an integrally-formed component. The support may comprise at least one of (a) a multi-section structure and/or (b) a center system integration section and/or (c) a structural support section and/or (d) a structural support section of the support comprising a section structure comprising a set of flanges with a web and at least one stiffener.

The present invention relates to a cross-member structure configured for installation in a vehicle providing vehicle systems comprising a beam structure comprising a set of mounting structures; a beam structure section; a steering column structure section and an intermediate structure section. The set of mounting structures may be configured to mount the beam structure to the vehicle. The beam structure may comprise a member comprising a first transverse section comprising a front structure and a rear structure. The front structure may comprise an opening and the rear structure may comprise an opening opposite the opening of the front structure. The first transverse section may comprise a laterally extending first web, a laterally extending upper flange, and a laterally extending lower flange. The first web, the upper flange and the lower flange may form the front structure and the rear structure. The beam structure may be configured for integration with at least one of the vehicle systems of the vehicle.

The present invention relates to a cross-member structure configured for installation in a vehicle providing vehicle systems comprising a beam structure comprising a set of mounting structures, a beam structure section, a steering column structure section and an intermediate structure section. The set of mounting structures may be configured to mount the beam structure to the vehicle. The beam structure may be configured for integration with at least one of the vehicle systems of the vehicle. The beam structure may comprise an integrally-formed component. The integrally-formed component may be formed from a composite material. The integrally-formed component may be formed from a molded plastic material. The beam structure may comprise an airbag system interface structure section. The cross-member structure may comprise a support. The support may be integrally formed with the beam structure. The support may comprise a center system integration section. The beam structure and the support may be configured to provide structural reinforcement for the vehicle and to integrate with at least one vehicle system with an instrument panel. The support may comprise a multi-section structure. The support may comprise a structural support section. The cross-member structure may comprise a bracket at the structural support section. The structural support section of the support may comprise a section structure comprising a set of flanges with a web and at least one stiffener. The beam structure section may comprise a section structure comprising a set of flanges and a web and at least one stiffener. The steering column structure section may comprise a section structure comprising a web with multiple stiffeners. Each stiffener may comprise a cross rib. Each flange may be configured in a generally parallel arrangement. The section structure of the steering column section may comprise a set of structural members comprising multiple spaced webs and a stiffener. The steering column structure section may be provided in a curved configuration. The intermediate structure section may comprise a section structure comprising a set of flanges with a web and at least one stiffener. The beam structure may comprise an airbag system interface structure section; the airbag system interface structure section may comprise a section structure comprising a set of flanges with a web and at least one stiffener. The section structure of the airbag system interface structure section may be configured for mounting an airbag module of an instrument panel. The vehicle systems may comprise at least one of: (a) a steering system; (b) an airbag system; (c) an entertainment system; (d) a ventilation system; (e) an instrumentation system; (f) a user interface system; (g) a center section; (h) a storage system. The beam structure may be configured for mounting of an instrument panel. The beam structure may comprise a multi-section structure. The beam structure may comprise a cross-member structure comprising a unitary construction providing relatively light-weight and relatively high-strength.

The present invention relates to a cross beam for an instrument panel comprising a member comprising a first transverse section comprising a front structure and a rear structure; the front structure may comprise an opening and the rear structure may comprise an opening opposite the opening of the front structure. The first transverse section may comprise a laterally extending first web, a laterally extending upper flange, and a laterally extending lower flange; the first web, the upper flange and the lower flange may form the front structure and the rear structure. The cross beam may comprise an angle between the upper flange and the first web of between 80 and 100 degrees and an angle between the lower flange and the first web of between 80 and 100 degrees. The cross beam may comprise a plurality of spaced webs extending along the first web between the upper flange and the lower flange. The cross beam may comprise at least one stiffener between adjacent webs. The plurality of spaced webs and the at least one stiffener may be symmetrically distributed related to the first web. The first transverse section may comprise a first reinforcement extending laterally from an intersection of stiffeners. The member may comprise a second transverse section extending laterally and outwardly from the first transverse section and comprising an upper structure and a lower structure opposite the upper structure of the second transverse section. The second transverse section may comprise a second web, a front flange and a rear flange; the second web, the front flange and the rear flange may form an upper structure and a lower structure. The cross beam may comprise an angle between the second web and the front flange of between 80 and 100 degrees and an angle between the second web and the rear flange of between 80 and 100 degrees. The cross beam may comprise a plurality of spaced webs extending along the second web between the front flange and the rear flange. The cross beam may comprise at least one stiffener between adjacent spaced webs. The at least one stiffener and the plurality of spaced webs may be symmetrically distributed relative to the third web. The second transverse section may comprise a second web extending laterally from an intersection of stiffeners; the second transverse section may be coupled to the first web of the first transverse section by a second reinforcement. The cross beam may comprise a support extending generally vertically from the member comprising a front structure and a rear structure; the front structure may comprise an opening and the rear structure may comprise an opening opposite the opening of the front structure. The support may comprise a third web, a left flange and a right flange; the third web, the right flange and left flange may form a front structure and a rear structure. The cross beam may comprise an angle between the left flange and the third web of between 80 and 100 degrees and an angle between the right flange and the third web of between 80 and 100 degrees. The cross beam may comprise a plurality of spaced webs extending along the third web between the left flange and the right flange. The cross beam may comprise at least one stiffener between adjacent spaced webs. The plurality of spaced webs and the at least one stiffener may be generally symmetrically distributed relative to the third web. The cross beam may comprise a connecting portion/mounting structure coupled to left and right ends or front and rear sides of the member comprising a trough structure comprising a stiffener. The member may be formed from a plastic comprising an equivalent isotropic tensile modulus no less than 7 GPa. The equivalent isotropic tensile modulus of the plastic may be between 8 and 10 GPa. The member may be integrally formed.

The present invention relates to a cross-member assembly configured for installation in a vehicle providing an instrument panel and at least one vehicle system may comprise: a support comprising a base and a beam structure comprising a beam structure section, a steering column structure section and an intermediate structure section. The beam structure and the support structure may be configured to provide structural reinforcement for the vehicle and to integrate with at least one vehicle system. The beam structure and base of the support may comprise an integrally-formed component. The integrally-formed component may be formed from a composite material. The integrally-formed component may be formed from a molded plastic material. The beam structure may comprise a set of mounting structures. The beam structure may comprise an airbag system interface structure section. The support may comprise a support member coupled to the base of the support. The support may comprise a center system integration section. The support may comprise a structural support section. The cross-member assembly may comprise a bracket at the structural support section. The set of mounting structures may be configured for installation of the beam structure in the vehicle as a support for the instrument panel.

FIGURES

FIG. 1A is a schematic perspective view of a vehicle according to an exemplary embodiment.

FIG. 1B is a schematic perspective cut-away view of a vehicle showing a vehicle interior according to an exemplary embodiment.

FIG. 1C is a schematic perspective view of an instrument panel for a vehicle according to an exemplary embodiment.

FIG. 2 is a schematic perspective view of a vehicle component according to an exemplary embodiment.

DESCRIPTION

Referring to FIGS. 1A and 1B-1C, a vehicle V is shown providing a vehicle interior with a cross-member structure CM shown as a cross-member assembly CMA and a trim component shown as an instrument panel IP. As indicated schematically in FIGS. 1B-1C, 2 and 5, the cross-member structure/cross-member assembly CM/CMA may be configured for installation between/across the sides of the vehicle (e.g. for structural reinforcement); as indicated schematically, the instrument panel IP may be installed over the cross-member structure/cross-member assembly CM/CMA. See FIGS. 1B-1C and 2.

As shown schematically according to an exemplary embodiment in FIGS. 1B-1C, 2, 3A and 5, the cross-member structure/cross-member assembly CM/CMA may comprise a beam structure C (e.g. in a generally horizontal arrangement when installed in the vehicle) and a support S (e.g. in a generally vertical arrangement when installed in the vehicle).

As indicated in FIGS. 1B and 1C, the vehicle may comprise vehicle systems/subsystems that are integrated within the vehicle interior including a steering system ST (e.g. with steering wheel/column assembly) and instrumentation/control system IC (e.g. providing instrumentation visible at/adjacent the steering system) and an airbag system (with airbag chute/module configured to deploy an airbag into the vehicle interior) and heating/ventilation and air conditioning system HVAC (e.g. with vents/ducts and outlets into the vehicle interior) and a user interface system ES (e.g. with display/panel, control elements, communications, audio/video, entertainment system, networking/connectivity, device connectivity) and a center section CS (e.g. with storage/compartments, system components, connectivity, center stack, console, etc.).

Figure 3A:
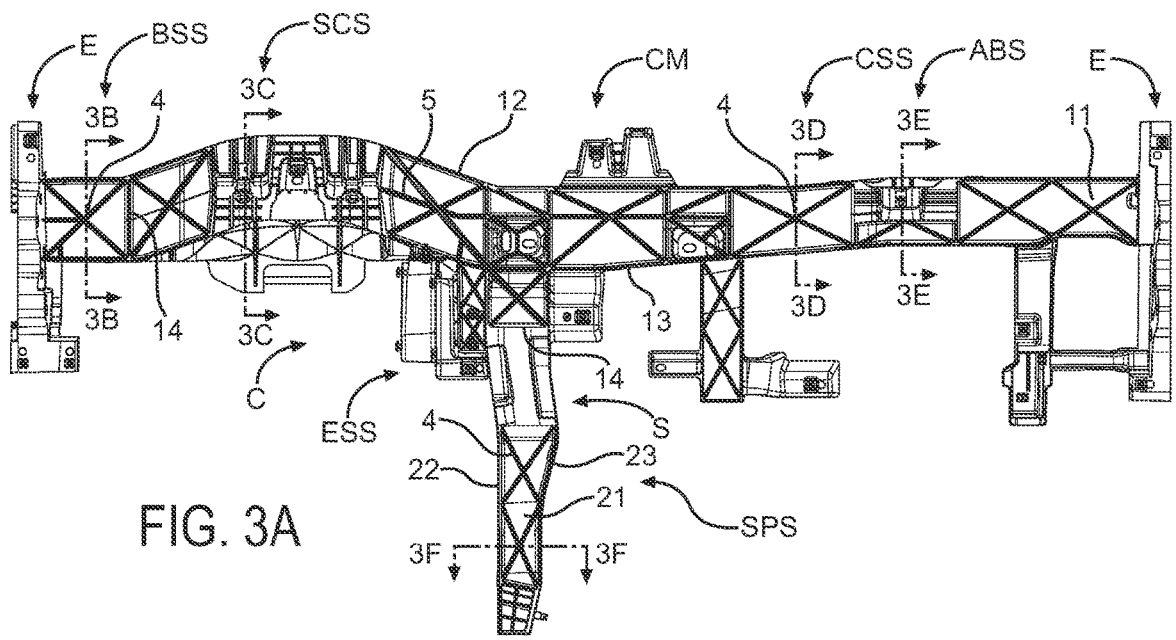
FIG. 3A is a schematic front view of a vehicle component according to an exemplary embodiment.
Figure 5:
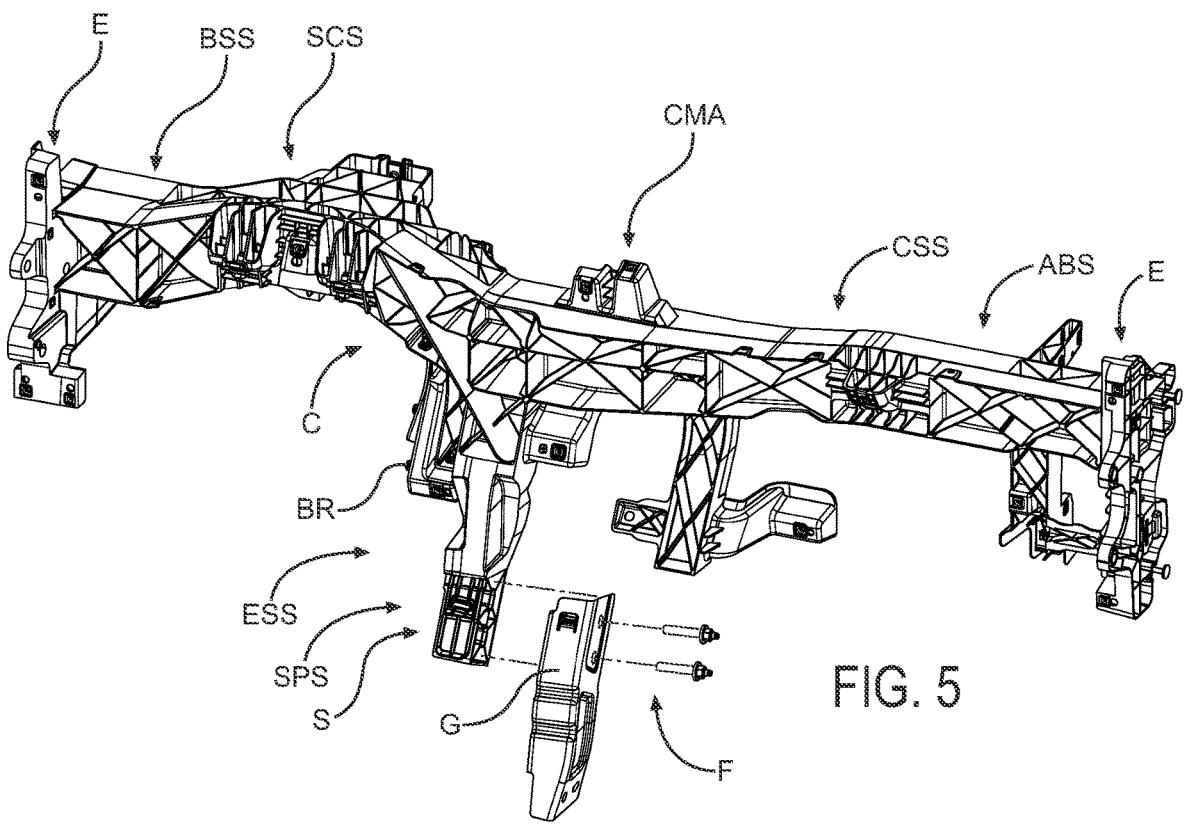
FIG. 5 is a schematic perspective view of a vehicle component according to an exemplary embodiment.

As indicated schematically in FIGS. 1B-1C, 2, 3A and 5, the cross-member structure/cross-member assembly CM/CMA may comprise a structure configured to provide a set of sections/segments configured for integration within the structure of the vehicle and with the vehicle systems/sub-systems. As shown in FIGS. 2, 3A and 5, the beam structure C (e.g. horizontal structure) of the cross-member structure/cross-member assembly CM/CMA may be configured to provide a set of mounting structures E (e.g. configured to be mounted to the vehicle structure) with a beam structure section BSS and a steering column structure section SCS (e.g. for the steering system/column assembly) and an intermediate structure section CSS (e.g. intermediate/center beam structure section) and an airbag system interface structure section ABS; the support S (e.g. vertical structure) of the cross-member structure/cross-member assembly CM/CMA may be configured to provide a center system integration section ESS to support a center stack/entertainment system integration section such as may provide a user interface, display, panel, etc. and a structural support section SPS.

As indicated schematically in FIGS. 1B-1C, 2, 3A and 5, the cross-member structure CM with beam structure C and support S may be engineered and configured to provide structural reinforcement for the vehicle and to integrate each of the vehicle systems/subsystems with the instrument panel IP.

As shown schematically according to an exemplary embodiment in FIGS. 2 and 3A-3F, the structure of the cross-member structure CM may be engineered and configured to provide a mounting structures E to the vehicle structure and for the instrument panel; as indicated schematically, the beam structure C and the support S each comprise a multi-section structure engineered and configured for performance requirements/specifications and for vehicle/vehicle system integration as shown in FIGS. 2, 3A-3F, 4 and 5 (e.g. with sections/structures provided and configured in shape, form, construction, etc.). According to an exemplary embodiment as indicated schematically, each section of the multi-section structure of the cross-member structure may be engineered/designed and configured/modified so that the beam structure C and support S as designed/installed are suited for a particular vehicle/vehicle application (e.g. with an arrangement of beam/structure sections, mounting sections, and structural elements including members, webs, flanges, stiffeners, reinforcements, plates, walls, panels, surfaces, wings, ribs, flaps, projections, spacers, portions, sections, slots, etc.). See FIGS. 2, 3A-3F, 4 and 5.

Figure 3B:
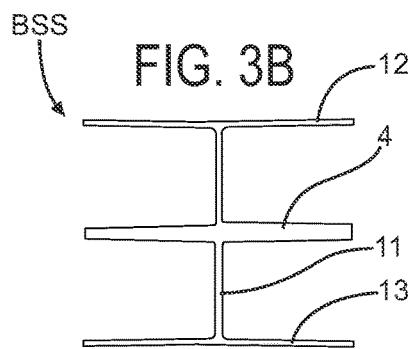
FIGS. 3B through 3F are schematic section views of a vehicle component according to an exemplary embodiment.
Figure 3C:
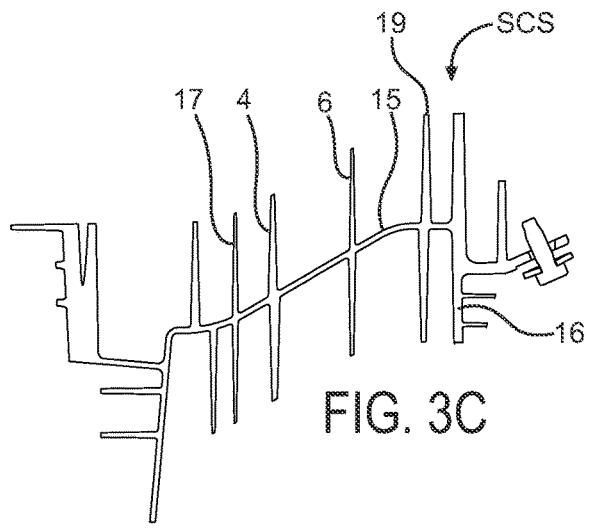
Figure 3D:
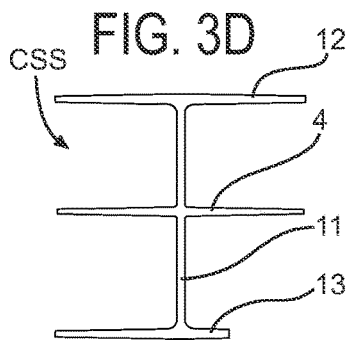
Figure 3E:
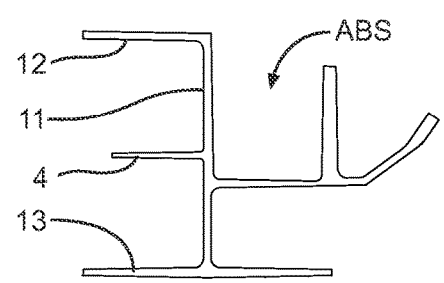

As shown schematically in FIGS. 2, 3A-3F and 4, the multi-section structure configuration of the beam structure C may comprise the mounting structures E and the beam structure sections BSS (shown in cross-section in FIG. 3B) and a steering column structure section SCS (shown in cross-section in FIG. 3C) and an intermediate/center structure section CSS (shown in cross-section in FIG. 3D) and an airbag system interface structure section ABS (shown in cross-section in FIG. 3E). As indicated schematically, each mounting structure E provides a mounting flange/section configured for attachment to the structure of the vehicle. See e.g. FIGS. 3 and 4.

Figure 3F:
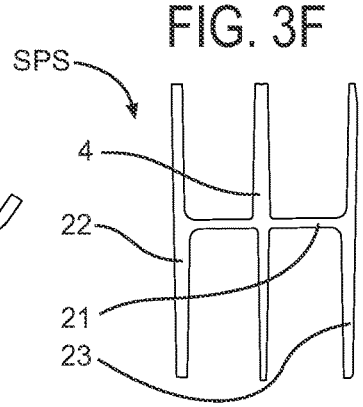

As shown schematically in FIGS. 2, 3A-3F and 4, the multi-section structure configuration of the support S may comprise the center system integration section ESS (e.g. with a bracket such as bracket BR that may be provided for connection/mounting) and a structural support section SPS (shown in cross-section in FIG. 3F).

Referring to FIGS. 2, 3A and 3B, the configuration of the beam structure section BSS may comprise a section structure providing a set of flanges 12/13 with a web 11 and stiffeners 4. See also FIG. 4.

Figure 4:
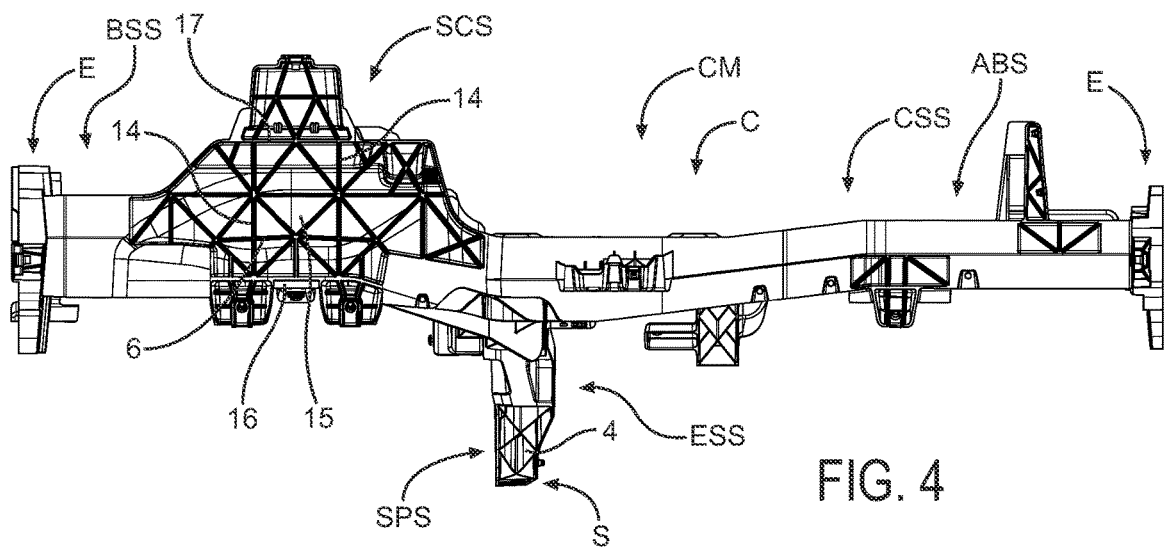
FIG. 4 is a schematic plan view of a vehicle component according to an exemplary embodiment.

Referring to FIGS. 2, 3A and 3C, the configuration of the steering column structure section SCS may comprise a base structure providing a web 15 with set of structural members shown as including a set of flanges 16/17 (e.g. in a generally parallel arrangement) and a stiffener 4 and a second reinforcement 6; the base structure may comprise a set of structural members including spaced webs 14 as shown in FIG. 4. As shown schematically, the base structure may be provided in a configuration to provide for mounting/interface with the steering column/wheel assembly (and associated instrumentation/control and front BIW). See FIGS. 1C, 2, 3A and 4. As indicated schematically in FIG. 4, the base structure of the steering column structure section may be provided in a curved/arch configuration. See also FIGS. 1B-1C and 2.

Referring to FIGS. 2, 3A and 3D, the configuration of the intermediate/center structure section CSS may comprise a section structure providing a set of flanges 12/13 with a web 11 and stiffeners 4. See also FIG. 4.

Referring to FIGS. 2, 3A and 3E, the configuration of the airbag system interface structure section ABS may comprise a section structure providing a set of flanges 12/13 with a web 11 and stiffeners 4; the beam structure/section structure may be provided in a configuration to provide for mounting/interface with the airbag module of the instrument panel. See also FIGS. 1C and 4.

Referring to FIGS. 2, 3A and 3F, the configuration of structural support section SPS of the support S may comprise a section structure providing a set of flanges 22/23 with a web 21 and stiffeners 4. See also FIG. 4.

As shown schematically according to an exemplary embodiment in FIGS. 2, 3A and 4, the multi-section configuration of the cross-member structure CM with beam structure C and support S may be provided in integrated/unitary construction (e.g. an integrally-formed molded construction). According to an exemplary embodiment, the cross-member structure CM may comprise an integrally-formed/molded form with the beam structure C and support S providing light-weight high-strength construction (e.g. formed from composite materials, plastic materials, etc. selected to provide suitable material properties of strength/performance). As shown schematically according to an exemplary embodiment, the multi-section configuration of the cross-member structure for a vehicle application may comprise a design/engineered arrangement of beam/structure sections, mounting sections, and structural elements (including members, webs, flanges, stiffeners, reinforcements, plates, walls, surfaces, wings, etc.) suited for the vehicle application/system integration (including shape, size, form, fit, materials, material properties, mass/weight, strength, rigidity, elasticity/flexibility, etc.) and the performance requirements/specifications. See FIGS. 2, 3A-3F, 4 and 5.

As shown schematically in FIG. 5, the cross-member structure may comprise a cross-member assembly CMA with a beam structure C and a support S providing a base in an assembly comprising a support member G (secured by fasteners shown as bolts F).

As indicated schematically in FIGS. 1B-1C, 2 and 5, implementation of the functionality of the cross-member structure may be provided with the cross-member assembly CMA and/or with the cross-member structure CM. As shown schematically, the multi-section cross-member structure may be engineered/designed and constructed/assembled with an arrangement of structural elements and sections configured to provide strength and rigidity as well as reduced weight and a fit/compact form for integration with the vehicle (including the vehicle structure and systems/subsystems). See generally FIGS. 1B-1C, 2 and 5.

As indicated schematically in FIGS. 1B-1C, 2, 3, 4 and 5, the cross-member structure may be configured to support and integrate with the instrument panel of the vehicle (and any associated structures/components for the vehicle such as a center stack/user interface, floor console, storage compartments, etc.).

As indicated schematically in FIGS. 1B-1C, the cross-member structure may be configured for integration with vehicle systems such as at least one of: (a) a steering system (shown as steering wheel/column ST); (b) an airbag system (shown as system AS with instrument panel IP); (c) an entertainment system (shown as entertainment system ES in center stack CS); (d) a ventilation system; (e) an instrumentation system (shown as instrumentation IC); (f) a user interface (e.g. such as providing a display panel, etc.); (g) center section/system (e.g. center stack with storage, connectivity, console, etc.); (h) storage system (e.g. compartment for storage in instrument panel, center storage compartment, holders, etc.).

As shown schematically, the improved cross member structure for a vehicle may comprise a cross-member structure comprising multiple sections configured (e.g. designed/engineered) to provide structural properties/performance for the vehicle application; the improved cross-member structure for a vehicle may be designed and constructed for use with materials that provide relatively light weight and relatively high strength and for efficient manufacture (e.g. as an integrally-formed component, formed from composite material, formed from plastic material, formed as an injection molded component, etc.). As indicated schematically, the improved cross-member structure may be configured for efficient manufacture and installation in a vehicle including integration with an instrument panel and one or more other vehicle systems.

Exemplary Embodiment

Referring to FIGS. 1A and 1B, a vehicle V is shown including an instrument panel IP with a cross-member structure/cross-member assembly CM/CMA according to an exemplary embodiment.

Referring to FIGS. 2, 3A and 4, a cross-member structure CM is shown schematically, wherein the longitudinal direction, i.e., the front-rear direction, refers to the direction of travel of the vehicle. According to an exemplary embodiment as shown schematically in FIGS. 3 and 4, the cross-member structure CM may comprise an integrally formed body comprising a beam structure C and a support S extending downwardly from the beam structure C in a vertical direction. The beam structure C may comprise a first transverse portion and a second transverse portion extending laterally outward from the first transverse portion. The first transverse portion may comprise a first web 11 extending in the lateral direction, and upper and lower sides of the first web 11 may respectively comprise an upper flange 12 and a lower flange 13 extending horizontally (as shown schematically in FIG. 3B), so that the front and rear trough structures of the first web 11 are respectively formed by the upper and lower flanges 12, 13 and the first web 11. Front and rear trough structures may be symmetrical, as shown in FIG. 3B; or may be designed to be asymmetrical according to the space requirements of the surrounding parts. According to an exemplary embodiment, the first web 11 may extend vertically, and the upper and lower flanges 12, 13 may be generally perpendicular to the first web 11. According to an exemplary embodiment, an angle between the upper flanges 12/the lower flanges 13 and the first web 11 may be formed between 80 and 100 degrees. A plurality of vertically extending spaced webs 14 may be arranged between the upper flange 12 and the lower flange 13, and the spaced webs 14 may be arranged along the lateral direction of the first web 11. At least one stiffener 4 may be provided between adjacent spaced webs 14 for reinforcing the connection in a lateral or longitudinal direction. FIGS. 3B and 3D are schematic cross-sectional views respectively taken along lines 3B and 3D of FIG. 3A showing structure formed by the upper and lower flanges 12, 13, the first web 11 and the stiffeners 4. The spaced webs 14 and the stiffeners 4 may be generally symmetrically distributed with respect to the first web 11. According to an exemplary embodiment, the stiffeners 4 may be slightly offset. A first reinforcement 5 may be arranged on the first transverse portion so as to extend horizontally from an intersection of stiffeners 4.

As shown schematically in FIG. 4, the second transverse portion of the beam structure C may comprise a second web 15 extending in the lateral direction, the second web 15 may be connected to the first reinforcement 5 for more efficient transfer of stress on the beam structure C. The front and rear sides of the second web 15 may comprise a front flange 16 and a rear flange 17 extending vertically, so that the front and rear flanges 16 and 17 are respectively on front and rear sides of the second web 15. The front and rear flanges 16 and 17 and the second web 15 may form an upper and lower trough structure comprising openings disposed opposite each other. The second web 15 may extend horizontally, and the front flange 16/the rear flange 17 and the second web 15 may form an angle of between 80 and 100 degrees. A plurality of vertically extending spaced webs 14 may extend between the front flange 16 and the rear flange 17, and the spaced webs 14 may be arranged along the lateral direction of the second web 15. At least one stiffener 4 between adjacent spaced webs 14 may reinforce the connection in a lateral or longitudinal direction. FIG. 3C is a schematic cross-sectional view taken along line 3C of FIG. 3A, showing an approximate fishbone cross section formed by the front and rear flanges 16, 17, the second web 15 and the stiffeners 4. The spaced web 14 and the stiffeners 4 may be generally aligned with respect to the second web 15. The spaced web 14 and the stiffeners 4 on an upper side of the second web 15 may be respectively aligned with the spaced webs 14 and the stiffeners 4 on a lower side of the second web 15 and may generally comprise the same depth. The second transverse portion may comprise a second reinforcement 6 extending vertically from an intersection of stiffeners 4. The second reinforcement 6 may be coupled to the first web 11.

As shown schematically in FIGS. 2 and 3A, the support S may be connected below the lower flange 13 of the beam structure C, may have a generally similar structure as the transverse portion of the beam structure C, and may comprise a third web 21. Left and right sides of the third web 21 may respectively comprise left and right flanges 22 and 23. The left and right flanges 22, 23 and the third web 21 may form front and rear trough structures of which openings disposed opposite each other. The third web 21 may extend downward from the lower flange 13; the third web 21 may extend vertically downward, the left and right flanges 22, 23 and the third web 21 may form an angle of between 80 and 100 degrees. Horizontally extending spaced webs 14 may extend between the left and right flanges 22, 23 and be arranged along the extending direction of the third web 21. At least one stiffener 4 may be provided between adjacent horizontally extending spaced webs 14 for reinforcing the connection in a lateral or longitudinal direction. FIG. 3F is a schematic cross-sectional view taken along line 3F of FIG. 3A, showing an approximately inverted U-shaped cross section formed by the left and right flanges 22, 23, the third web 21 and the stiffeners 4. The spaced web 14 and the stiffeners 4 may be symmetrically distributed with respect to the third web 21. The support S may comprise a third reinforcement (not shown) extending vertically from an intersection of stiffeners 4.

The cross-member structure CM may be integrally formed of plastic material. To ensure the rigidity requirement of the cross-member structure CM of the instrument panel, it's preferred to choose a plastic material having an equivalent isotropic tensile modulus (see Journal of National University of Defense Technology, Vol. 18, No. 4, December 1996) of no less than 7 GPa, preferably a plastic material having an equivalent isotropic tensile modulus of 8 to 10 GPa may be selected. Conventional plastic materials (e.g. polypropylene PP, nylon PA materials that are reinforced with fibers (e.g., glass fiber)) may be selected. First web 11, second web 15, third web 21 and flanges 12, 13, 16, 17, 22, 23 may have wall thicknesses of not less than 2.0 mm, stiffeners 4 may have a minimum thickness of at least 1 mm. The above design compensates for the problem of insufficient performance of conventional materials by increasing the size of the parts, while reducing the material cost. Compared with the same steel dashboard beam, the weight may be reduced by more than 25 percent, and the difficulty of mold design and manufacturing equipment process may also be reduced.

Referring to FIGS. 2, 3C, 3E and 4, the cross-member structure CM may comprise connecting portions/mounting structure E connected to the two ends or sides of the beam structure C. Because of the limitation of a mold, the connecting portion may be a one-side trough structure opening outwards, and the one-side trough structure may comprise stiffeners 4 for reinforcing the connection in a lateral or longitudinal direction. The connecting portion may be integrally formed with the cross-member structure CM, or may be separately molded and then welded or bolted to form the cross-member structure CM, such as the split plastic small bracket BR. The cross-member structure CM may be connected to other electrical components (such as meters, air conditioners, steering columns, etc.) through metal connection points provided on the connecting portion, such as a U-shaped insert nut or a bolt/fastener.

According to an exemplary embodiment as shown schematically in FIG. 5, a cross-member structure CMA may comprise a steel support member/bracket G bolted to a main body of a plastic beam.

According to an exemplary embodiment, a cross-member structure CM for an instrument panel may comprise a beam structure C comprising a first transverse section comprising a front structure and a rear structure; the front structure may comprise an opening and the rear structure may comprise an opening opposite the opening of the front structure. See e.g. FIGS. 2, 3A and 3B.

According to an exemplary embodiment, the first transverse section may comprise a laterally extending first web 11, a laterally extending upper flange 12, and a laterally extending lower flange 13; the first web 11, the upper flange 12 and the lower flange 13 may form the front structure and the rear structure. See e.g. FIGS. 2, 3A and 3B. According to an exemplary embodiment, the cross-member structure CM may comprise an angle between the upper flange 12 and the first web 11 of between 80 and 100 degrees and an angle between the lower flange 13 and the first web 11 of between 80 and 100 degrees. See e.g. FIGS. 2, 3A and 3B. According to an exemplary embodiment, the cross-member structure CM may comprise a plurality of spaced webs 14 extending along the first web 11 between the upper flange 12 and the lower flange 13. See e.g. FIGS. 2 and 3A. According to an exemplary embodiment, the cross-member structure CM may comprise at least one stiffener 4 between adjacent spaced webs 14. See e.g. FIGS. 2, 3A and 3B. According to an exemplary embodiment, the plurality of spaced webs 14 and the at least one stiffener 4 may be symmetrically distributed related to the first web 11. According to an exemplary embodiment, the first transverse section may comprise a first reinforcement 5 extending laterally from an intersection of stiffeners 4. See e.g. FIGS. 2, 3A and 3C.

According to an exemplary embodiment, the beam structure C may comprise a second transverse section extending laterally and outwardly from the first transverse section and comprising an upper structure and a lower structure opposite the upper structure of the second transverse section. See e.g. FIG. 4. According to an exemplary embodiment, the second transverse section may comprise a second web 15, a front flange 16 and a rear flange 17; the second web 15, the front flange 16 and the rear flange 17 may form an upper structure and a lower structure. See e.g. FIGS. 3C and 4. According to an exemplary embodiment, the cross-member structure CM may comprise an angle between the second web 15 and the front flange 16 of between 80 and 100 degrees and an angle between the second web 15 and the rear flange 17 of between 80 and 100 degrees. See e.g. FIG. 3C. According to an exemplary embodiment, the cross-member structure CM may comprise a plurality of spaced webs 14 extending along the support between the front flange 16 and the rear flange 17. The cross-member structure CM may comprise at least one stiffener 4 between adjacent spaced webs 14. At least one stiffener 4 and the plurality of spaced webs 14 may be symmetrically distributed relative to the second web 15. The second transverse section may comprise a second reinforcement 6 extending laterally from an intersection of stiffeners 4; the second transverse section may be coupled to the first web 11 of the first transverse section by the second reinforcement 6. See e.g. FIG. 4.

According to an exemplary embodiment, the cross-member structure CM may comprise a support S extending generally vertically from the beam structure C comprising a front structure and a rear structure; the front structure may comprise an opening and the rear structure may comprise an opening opposite the opening of the front structure. See e.g. FIGS. 2, 3A and 4. The support S may comprise a third web 21, a left flange 22 and a right flange 23; the third web 21, the right flange 23 and left flange 22 may form a front structure and a rear structure. See e.g. FIGS. 2, 3A and 3F. The cross-member structure CM may comprise an angle between the left flange 22 and the third web 21 of between 80 and 100 degrees and an angle between the right flange 23 and the third web 21 of between 80 and 100 degrees. See e.g. FIG. 3F. The cross-member structure CM may comprise a plurality of spaced webs 14 extending along the support S between the left flange 22 and the right flange 23.

The cross-member structure CM may comprise at least one stiffener 4 between two adjacent spaced webs 14. See e.g. FIGS. 2, 3A and 4. The plurality of spaced webs 14 and the at least one stiffener 4 may be generally symmetrically distributed relative to the support S.

The cross-member structure CM may comprise connecting portion/mounting structures E coupled to left and right ends or front and rear sides of the beam structure C comprising a trough structure comprising a stiffener 4.

The cross-member structure CM may be formed from a plastic comprising an equivalent isotropic tensile modulus no less than 7 GPa. The equivalent isotropic tensile modulus of the plastic may be between 8 and 10 GPa. The beam structure C may be integrally formed.

According to an exemplary embodiment, a cross beam for an instrument panel may comprise a body; the body may comprise a member; the member may comprise a first transverse section comprising a first opening and a second opening opposite the first opening.

According to an exemplary embodiment, a first transverse section may include a laterally extending first web; the first web may comprise an upper side comprising a laterally extending upper flange and a lower side comprising a laterally extending lower flange; the upper flange and the lower flange may form front and rear trough structures.

According to an exemplary embodiment, the member may comprise a second transverse section extending laterally outward from the first transverse section and comprising an upper trough structure and a lower trough structure opposite the upper trough structure along the extending direction of the second transverse section.

The second transverse section may comprise a laterally extending second web; a front side of the second support member may comprise a laterally extending front flange; a rear side of the second support member may comprise a laterally extending rear flange; the front and rear flanges and the second support member may form upper and lower channel structures.

According to an exemplary embodiment, the body may comprise a support extending in a vertical direction and comprising a front trough structure and a rear trough structure opposite the front trough structure. According to an exemplary embodiment, the support may comprise a third web extending in a vertical direction; a left side of the third web may comprise a left flange extending in a vertical direction and a right side of the third web may comprise a right flange extending in a vertical direction, the left flange and the right flange may form a front trough structure and a rear trough structure.

According to an exemplary embodiment, a plurality of spaced webs may be disposed between the upper and lower flanges and/or the front and rear flanges and/or the left and right flanges; the spaced webs may be arranged at intervals along the first web and/or the second web and/or the extension direction of the third web.

According to an exemplary embodiment, an angle between 80 degrees and 100 degrees may be formed between the upper and lower flanges and the first web and/or between the front and rear flanges and the second web and/or the left and right flanges and the third web.

According to an exemplary embodiment, at least one stiffener/cross rib may be disposed between adjacent spaced webs. According to an exemplary embodiment, the spaced webs and the stiffeners/cross ribs may be symmetrically distributed with respect to the first web, the second web or the third web.

According to an exemplary embodiment, the first transverse section may comprise a first reinforcement extending laterally from an intersection of stiffeners and may be connected to the second web of the second transverse section by the first reinforcement. According to an exemplary embodiment, the second transverse section may comprise a second reinforcement extending laterally from an intersection of stiffeners and may be connected to the first web of the first transverse section by the second reinforcement.

According to an exemplary embodiment, the cross beam for the instrument panel may comprise a connecting portion/mounting structure connected to the left and right ends or the front and rear sides of the member, the mounting structure may comprise a single-sided trough structure comprising an opening and a stiffener.

According to an exemplary embodiment, the body may be formed of a plastic material comprising an equivalent isotropic tensile modulus of not less than 7 GPa, preferably 8-10 GPa. According to an exemplary embodiment, the plastic material may comprise polypropylene or nylon; the plastic material may comprise a glass fiber reinforced material. According to an exemplary embodiment, the body may be integrally formed.

According to an exemplary embodiment, a cross beam for an instrument panel may comprise a body; the body may comprise a main beam; the main beam may comprise a first transverse section; front and rear troughs may be arranged opposite to each other along an extending direction of a first horizontal structure. Through the front and rear trough structure, the cross beam may reduce an inner cavity depth of at least one of the front and/or the rear trough structure so as to improve the overall strength of the member and stiffness performance based on the same outer contour size and reduce molding and manufacturing process requirements.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A cross-member structure (CM) configured for installation in a vehicle providing vehicle systems comprising:
 a unitary plastic beam structure (C) integrally formed with:
 (a) a set of plastic mounting structures (E);
 (b) a plastic beam structure section (BSS);
 (c) a plastic steering column structure section (SCS); and
 (d) a plastic intermediate structure section (CSS);
 wherein the set of plastic mounting structures (E) comprises a molded plastic material configured to mount the plastic beam structure (C) to the vehicle;
 wherein the plastic beam structure (C) and the set of plastic mounting structures (E) comprises a molded plastic material;
 wherein the set of plastic mounting structures comprises a molded plastic flange mounting structure (E) integrally formed in the plastic beam structure (C) adjacent to the plastic beam structure section (BSS);
 wherein the set of plastic mounting structures comprises a molded plastic flange mounting structure (E) integrally formed in the plastic beam structure (C) adjacent to the plastic intermediate structure section (CSS);
 wherein the unitary plastic beam structure (C) comprises a unitary integrally-formed molded plastic structure with the integrally-formed molded plastic flange mounting structures (E);
 wherein the integrally-formed molded plastic flange mounting structures (E) comprise generally flat flange mounting structures;
 wherein the integrally-formed molded plastic flange mounting structures (E) comprise generally flat flange mounting structures transverse to the plastic beam structure (C).

2. The structure of claim 1 wherein the beam structure (C) comprises an integrally-formed component.

3. The structure of claim 2 wherein the integrally-formed component is formed from a composite material.

4. The structure of claim 2 wherein the integrally-formed component is formed from a molded plastic material.

5. The structure of claim 1 wherein the beam structure (C) comprises an H-shaped cross-section; wherein the H-shaped cross-section comprises a section structure.

6. The structure of claim 5 wherein the beam structure (C) comprises a multi-section structure; wherein the beam structure (C) comprises a cross-member structure comprising a unitary construction providing relatively light-weight and relatively high-strength.

7. The structure of claim 1 further comprising a support (S).

8. The structure of claim 7 wherein the support (S) is integrally formed with the beam structure (C).

9. The structure of claim 1 wherein the beam structure section (BSS) comprises a section structure.

10. The structure of claim 1 wherein the intermediate structure section (CSS) comprises a section structure comprising a set of flanges (12, 13) with a web (11) and at least one stiffener (4).

11. The structure of claim 1 wherein the steering column structure section (SCS) comprises a section structure.

12. The structure of claim 5 wherein the H-shaped cross-section of the beam structure (C) comprises a section structure.

13. The structure of claim 1 wherein the beam structure (C) comprises at least one of (a) a composite material and/or (b) plastic material and/or (c) an integrally-formed component formed from a composite material.

14. The structure of claim 7 wherein the support (S) is configured to provide structural reinforcement.

* * * * *